United States Patent

[11] 3,587,246

| [72] | Inventor | Derek Howard |
| --- | --- | --- |
| | | Stony Brook, N.Y. |
| [21] | Appl. No. | 852,188 |
| [22] | Filed | Aug. 22, 1969 |
| [45] | Patented | June 28, 1971 |
| [73] | Assignee | Fairchild Hiller Corporation, |
| | | Montgomery County, Md. |

[54] AIR CONDITIONING SYSTEMS
1 Claim, 3 Drawing Figs.

[52] U.S. Cl. ..................................................... 62/501,
62/61, 62/241, 62/402, 417/355
[51] Int. Cl. ........................................................ F25b 1/00
[50] Field of Search ........................................... 62/242,
172, 241, 501; 230/116

[56] References Cited
UNITED STATES PATENTS

| 347,709 | 8/1886 | Hope ............................ | 230/116 |
| 941,834 | 11/1909 | Wing ............................ | 230/116 |
| 2,098,558 | 11/1937 | Anderson ..................... | 62/242 |
| 2,473,496 | 6/1949 | Mayer .......................... | 62/172 |

Primary Examiner—William J. Wye
Attorney—Michael W. York

ABSTRACT: A pneumatically driven air conditioning system in which a turbine is provided to drive a refrigerant compressor. The turbine vanes are formed about the periphery of a loop carried by a plurality of fan blades which are fastened to the compressor shaft. The turbine driven fan also serves to drive the compressor, draw air through a condenser and provide cooling for the refrigerant compressor and related mechanisms such as bearings and the like.

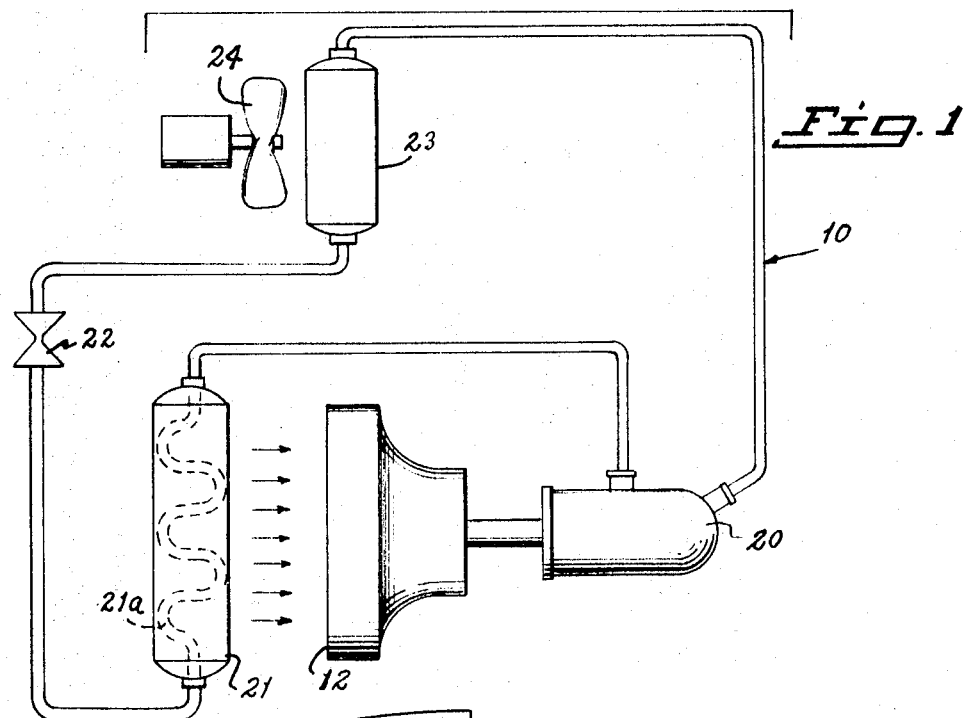
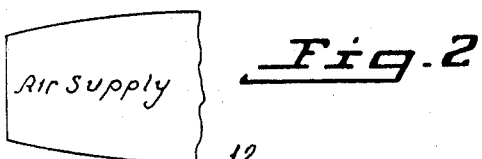
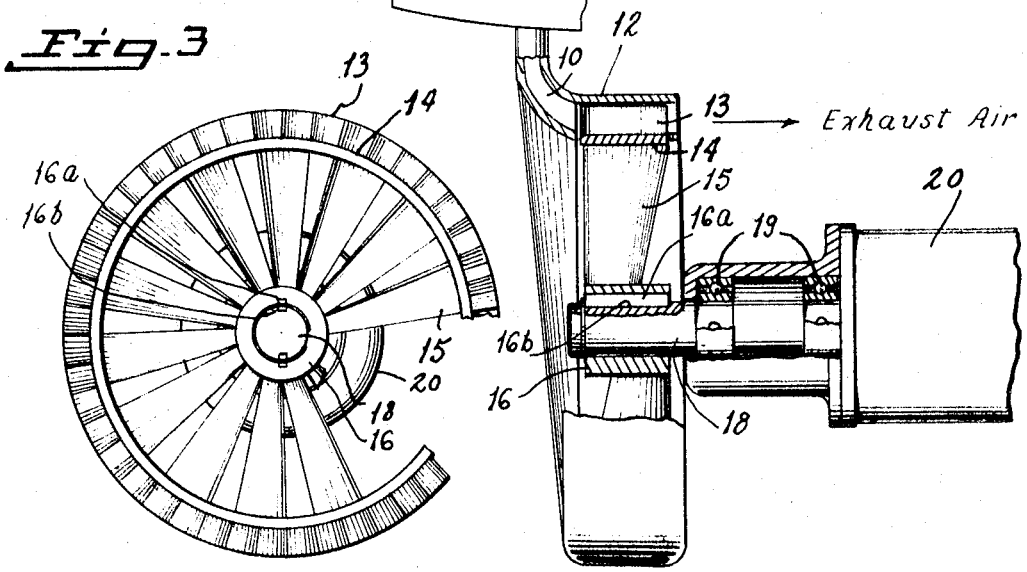
INVENTOR.
Derek Howard

AIR CONDITIONING SYSTEMS

This invention relates generally to power driven mechanisms for air conditioning systems and more particularly to a compact turbine driven fan and compressor arrangement which may be utilized for fluid circulation in air conditioning and refrigeration systems.

Means for conditioning air or other gaseous fluids are known to the art, and include the so-called vapor cycle unit for the cooling of air or other gases. Typically such systems use a coolant such as Freon which is compressed and expanded during the operating cycle to provide the cooling fluid with heat that has been removed from an air stream passing in heat exchange relation with the vapor. Although such vapor cycle systems have many advantages including the capability to deliver substantially more refrigerating capacity for the same power input as other systems, the complexity, size and weight of such systems have weighed heavily against their more widespread use. However, such vapor cycle systems possess several other outstanding features which make them particularly suitable for use in certain applications.

As an example, aircraft air conditioning systems are frequently driven from the aircraft's main propulsion engines or alternatively by auxiliary power generating units provided on the aircraft for that purpose. While each power system has advantages and disadvantages, the use of one arrangement over another in a give application is usually arrived at after a careful evaluation and analysis of many aircraft performance factors. In any case, regardless of the source of motive power, a great majority of these aircraft air conditioning systems are pneumatically driven, the pneumatic power being furnished either by an auxiliary power unit or bled from the compressor stages of the main propulsion engine.

Since the vapor cycle system requires less power input to achieve comparable cooling performance as might be produced by other refrigeration cycles, the power supply to the system obviously need not be as great. Consequently, in systems driven by auxiliary power units, these units can be smaller and lighter while in systems powered by bleed air from the main engine, the engine need not be taxed or its power increased to provide sufficient bleed air to produce acceptable levels of cooling performance.

This is particularly important in situations when an aircraft has a cooling demand while not in flight, as would be the case when the aircraft is taxiing or loaded and on the ground for other reasons. In addition, most vapor cycle systems can be satisfactorily operated without the ram air produced by the forward movement of the aircraft.

In view of these facts, it is a principal object of the present invention to reduce the complexity, size and weight of such vapor cycle systems by providing an improved and compact arrangement wherein the turbine, fan and compressor portion of such systems are cooperatively arranged with a minimum number of components and controls and all of the attendant advantages achieved thereby.

A further object of this invention is the provision of a turbine driven refrigeration compressor in which any malfunction of the driven unit or removal of part or all of the load during operation will be incapable of inducing a dangerous turbine runaway condition.

These and other objects, features and advantages of the invention will become more apparent from the following description of the invention and the accompanying drawings in which:

FIG. 1 is a schematic representation of a typical vapor cycle air conditioning system equipped with the present invention.

FIG. 2 is a side elevation of the turbine driven fan and compressor device according to the present invention.

FIG. 3 is a front elevation of the turbine driven fan and compressor device of the present invention with certain portions removed and broken away for clarity.

Referring now to FIG. 1 in the drawings, it will be noted that a typical vapor cycle air conditioning system 10 has been schematically illustrated.

In a simplified form and by way of example only, the typical vapor cycle air conditioning system includes a compressor 20 operatively connected to a condenser 21. Low pressure refrigerant is drawn into the compressor 20, compressed and then discharged to a condenser 21 where heat is rejected to ambient air and refrigerant condensing takes place. The liquified refrigerant is then directed through an expansion valve 22 where refrigerant expansion takes place and the refrigerant pressure and temperature are reduced. The refrigerant is then directed to an evaporator 23 which is exposed to a stream of air which may be provided by a fan 24 which may be driven by some convenient source. In the evaporator 23 the refrigerant boils as it absorbs heat from the circulating air being conditioned and when converted back to a gas is returned to the compressor.

Such vapor cycle air conditioning systems when used aboard aircraft, are frequently driven by pneumatic power since large volumes of bleed air are readily available from the main aircraft engines. However, conventional systems have employed power takeoffs and gear boxes to transmit power from the turbine to one or more fans utilized in the vapor cycle system to draw air across the condenser and to provide cooling for the compressor and related components such as bearings and gear boxes.

In the proposed system a turbine 12 is adapted to be driven by bleed air drawn from the compressor stages of a main propulsion engine. However, it is obvious that any other source of pressurized fluid may be used as an alternative to supply the motive force to the turbine. The bleed air is introduced to the turbine inlet through means in operative relationship with turbine blades 12 and connected to the source of air such as an inlet nozzle 10, as best seen in FIG. 2, which is well known fashion, accelerates the air and directs the flow in a tangential manner with respect to the turbine blade 13 of the turbine 12. The air then impinges against the turbine blades 13 and experiences a change in momentum and direction due to the shape of the turbine blades 13, which is the source of the turning force which causes the turbine blades to rotate.

In accordance with the present arrangements a plurality of turbine blades 13 of conventional configuration are formed on or connected at their inner ends to the periphery or wall of a hoop member 14 and extended radially outward from the hoop member which is concentrically situated with respect to a shaft 18. The hoop member 14 is located around and connected to the outer ends of the fan blades 15 and associated turbine blades 13 are maintained in spaced-apart relationship from said shaft 18 by the plurality of fan blades 15 which are affixed to the inner circumference of said hoop member 14 at one end and at their opposite extremities and their inner ends to a hub 16, from which said blades radiate outwardly therefrom.

The quantity and shape of said fan blades 15 for a given application, as well as the quantity and shape of the turbine blades 13 for a given application, are determined by a number of parameters well known to those skilled in the art. However, in the present arrangement, for reasons which will become more readily apparent as we progress, the fan blades 15 are configured by quantity, shape and angle to absorb the total power generating capability of the turbine blades 13 at a speed which is substantially above the normal operating speed of the turbine, but far below the speed at which the rotating mass will have a self destructing capability. This speed is readily predictable as indicated, by those skilled in the art using normal and every day engineering practices.

The aforementioned hub 16, from which the fan blades 15 radiate, is securely mounted an and adapted to rotate with the shaft 18 by means of the keys and keyways 16a and 16b respectively, as best seen in FIGS. 2 and 3 of the drawings.

In accordance with the teachings of the present invention, the fan blades 15 replace the disc portion found in conventional turbine wheel structures and in this particular application provide the means whereby air may be drawn across a series of coils 21a situated within a refrigerant condenser 21 of a typical vapor cycle refrigeration system. By this method the refrigerant within the coils 21a is cooled permitting condensation of the refrigerant to take place in the condenser.

In referring to the drawings it will also be noted that the aforementioned shaft 18 is directly connected to a refrigerant compressor for driving the compressor which may be of any of a number of different types but in the preferred embodiment is of the rotary helical screw or Lysholm variety which is well known to those skilled in the art.

As indicated in the drawings and in keeping with the teachings of this invention, the fan blades 15 are so located with respect to the condenser that in addition to drawing air through the condenser 21 and across the condenser coils 21a they also provide a cooling flow of air for the bearings 19 which support shaft 18 and for the compressor 20. In this manner some of the heat of compression is removed from the compressor increasing the density of the refrigerant being compressed and thereby improving the volumetric efficiency of the compressor. At this point it may be helpful to note that although the flow of air directed across the bearings 19 and compressor 20 has picked up the heat from the condenser its temperature is still substantially lower than that of the bearings and compressor so that there is a net cooling effect which improves the overall efficiency considerably.

An additional and underlying feature of the invention resides in a self governing speed control capability which is an outgrowth of the turbine fan combination heretofore described. To fully appreciate this it should be borne in mind that the integral turbine 13/ fan 15 arrangement as described earlier can never achieve a speed which would result in material disintegration of the turbine/fan and the subsequent catastrophic events which can follow, particularly in aircraft applications. In this connection there have been several occasions where serious aircraft accidents have been the result of runaway turbines, where the turbines have reached self destructive speeds, disintegrated and sent fragments through the aircraft structure with tremendous speed and force which at least in several instances have resulted in a complete loss of the aircraft. These failures can usually be traced to malfunctions in various systems which have, in effect, removed the load from the turbine and permitted it to overspeed. Needless to say, there has been considerable preoccupation with this aspect in the design of aircraft systems so that many present day systems incorporate complex and sophisticated speed control devices, oftentimes redundant, to diminish these risks. With the arrangements proposed herein, the possibility of such catastrophic events are drastically reduced in that any failure of the drive shaft 18, compressor or any other associated machinery that might remove the load from the turbine will not bring about a turbine runaway condition. If such a situation were to occur, the turbine 12 would be loaded by the integral fan blades 15 and could accelerate only until such time as the turbine power is fully absorbed and balanced by the fan power. That is to say that the energy producing capability of the turbine can never in the present invention exceed the power absorbing capability of the fan and the likelihood of such a runaway failure is thereby impossible.

More importantly, this inherent capability is achieved without the need to restore to complex and sophisticated controls which are both costly to produce and maintain and add considerable weight to the system.

The invention has been described in its preferred form and by way of example only and obviously many variations and modifications can be made without departing from the spirit of the invention.

Therefore the invention should not be limited to any specific form or embodiment except insofar as such limitations are set forth in the appended claims.

I claim:

1. In an air conditioning apparatus, a compressor for compressing a refrigerant, a drive shaft connected to the compressor for driving said compressor, a hub securely mounted on and adapted to rotate with said drive shaft, a plurality of fan blades connected at their inner ends to said hub and extending radially outward therefrom, a hoop located around and connected to the outer ends of said fan blades, a plurality of turbine blades connected at their inner ends to the outer wall of said hoop and extending radially outward therefrom, said fan blades being adapted to limit the speed of said turbine blades, a source of compressed air, means in operative relationship with said turbine blades and connected to said source of air for directing air to said turbine blades, and a condenser operatively connected to said compressor, said fan blades being located with respect to condenser to draw air across the coils of said condenser and to direct said air across said compressor.